United States Patent [19]

Feider et al.

[11] Patent Number: 4,880,124

[45] Date of Patent: Nov. 14, 1989

[54] STRADDLE CRANE STEERING SYSTEM

[75] Inventors: Thomas Feider; Gerald P. Lamer; Norbert W. Lenius, all of Sturgeon Bay, Wis.

[73] Assignee: Marine Travelift, Inc., Sturgeon Bay, Wis.

[21] Appl. No.: 185,192

[22] Filed: Apr. 22, 1988

[51] Int. Cl.$^4$ ............................................. B66C 5/02
[52] U.S. Cl. .................................... 212/218; 180/140; 180/252
[58] Field of Search ............... 212/205, 153, 157, 218, 212/219, 220; 180/140, 152, 160, 162, 252, 308

[56] References Cited

U.S. PATENT DOCUMENTS

| | | | |
|---|---|---|---|
| 3,081,883 | 3/1963 | Minty | 212/219 |
| 3,161,309 | 12/1964 | Baudhuin et al. | 212/218 |
| 3,247,975 | 4/1966 | Holt et al. | 212/218 |
| 3,329,284 | 7/1967 | Bogart et al. | 212/218 |
| 3,877,391 | 4/1975 | Gimperlein et al. | 212/218 |
| 4,444,287 | 4/1984 | Voelz | 180/308 |
| 4,531,604 | 7/1985 | Lamer | 180/152 |

FOREIGN PATENT DOCUMENTS 8758  1/1981  Japan ................................. 180/252

Primary Examiner—Sherman D. Basinger
Assistant Examiner—Stephen P. Avila
Attorney, Agent, or Firm—Wallenstein, Wagner & Hattis, Ltd.

[57] ABSTRACT

The invention is suitable for use in a straddle-type crane having a frame and four corners, and comprises a system for the manual resynchronization or automatic synchronous movement of a plurality of pairs of steerable wheels. The pairs of steerable wheels are pivotal relative to the frame. The system comprises a hydraulically-actuated link and tie rod at each corner of the frame to turn all pairs of steerable wheels at each corner of said frame. It further comprises a hydraulic cylinder for each of the hydraulically-actuated links and tie rods, with the hydraulic cylinders being connected to each other in series relationship. The system also comprises a steering orbitrol which directs hydraulic fluid through the series-connected hydraulic cylinders.

4 Claims, 4 Drawing Sheets

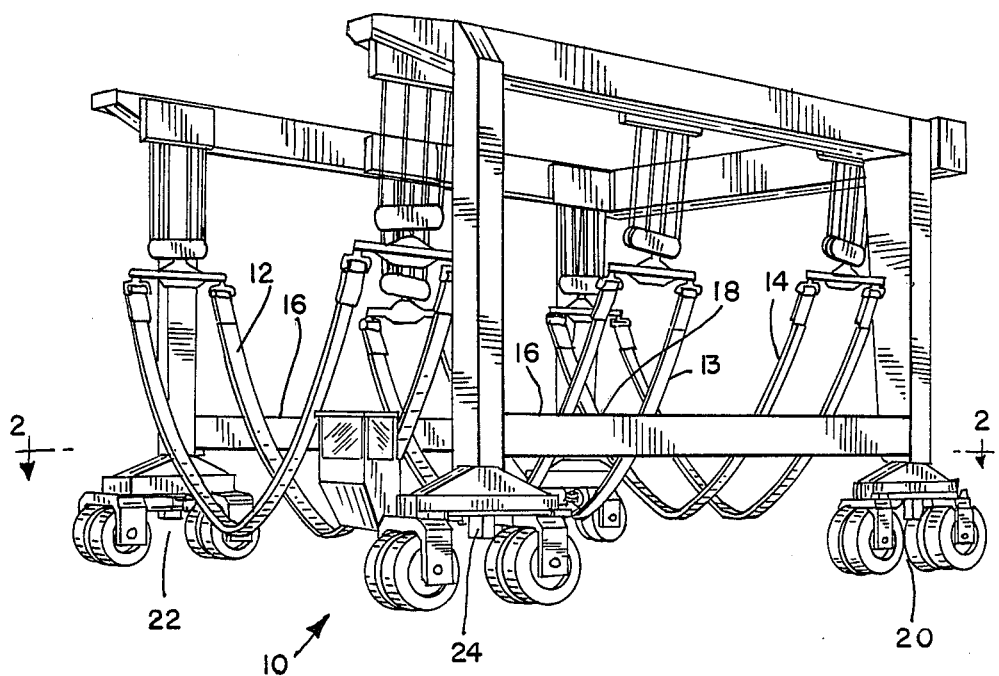
FIG_1.
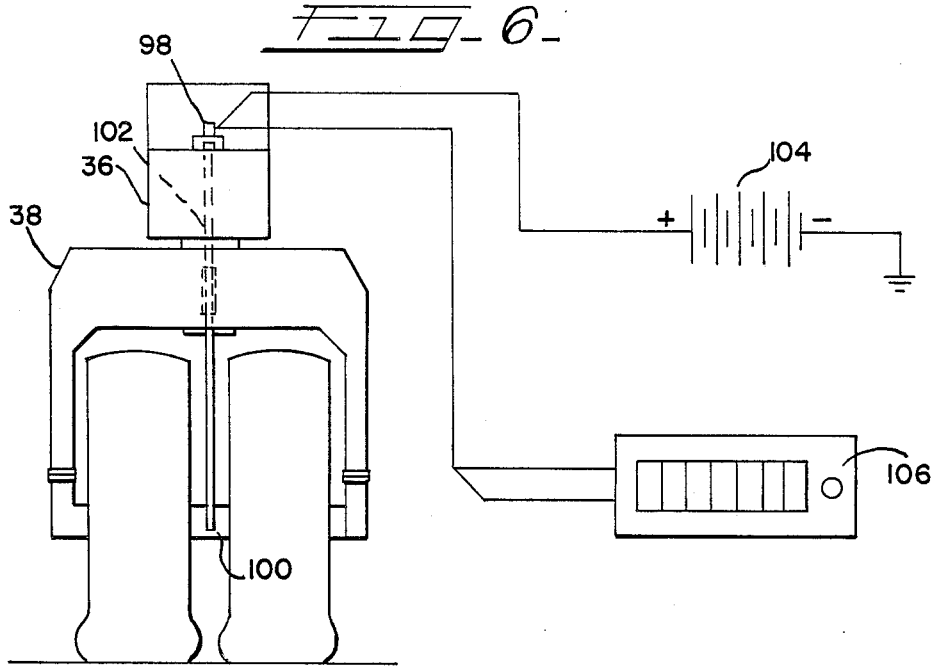
FIG_6.

FIG-2
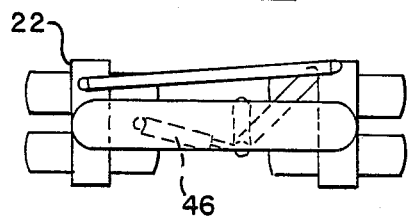
LEFT REAR
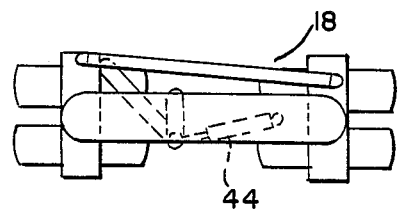
LEFT FRONT
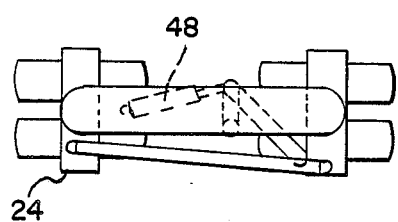
RIGHT REAR
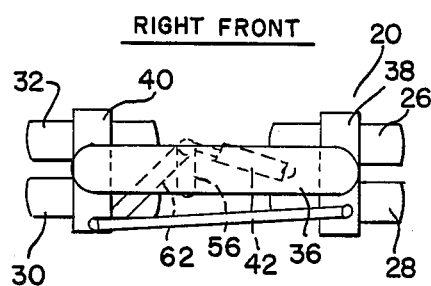
RIGHT FRONT
FIG-3
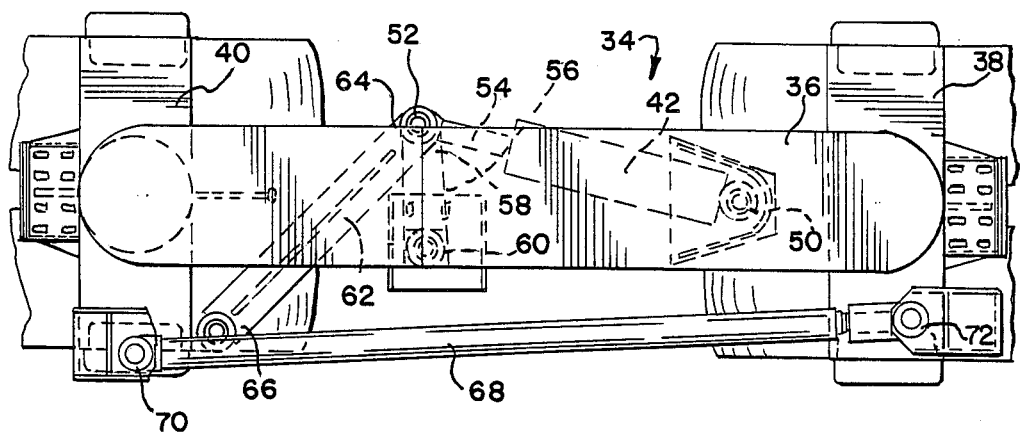

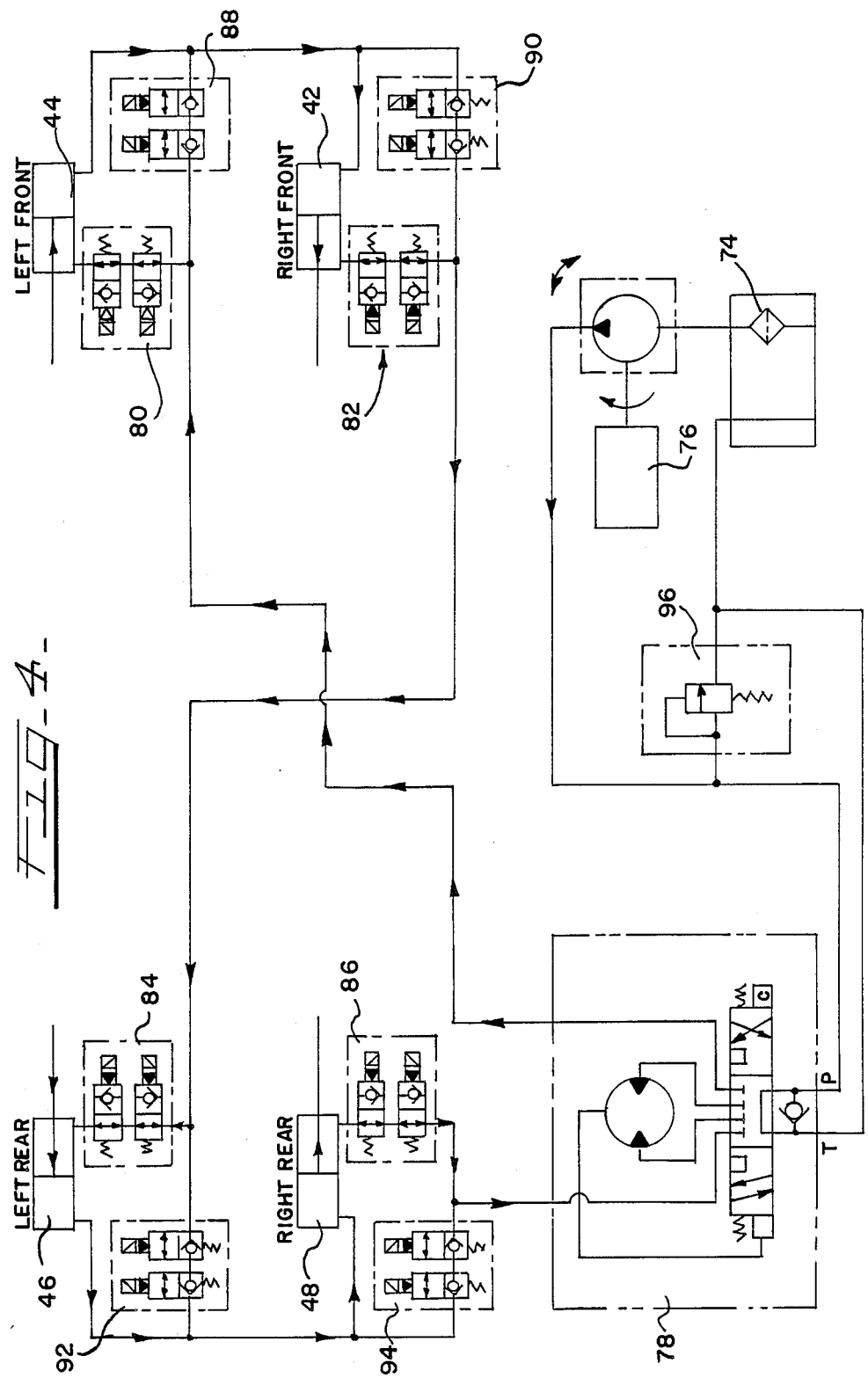

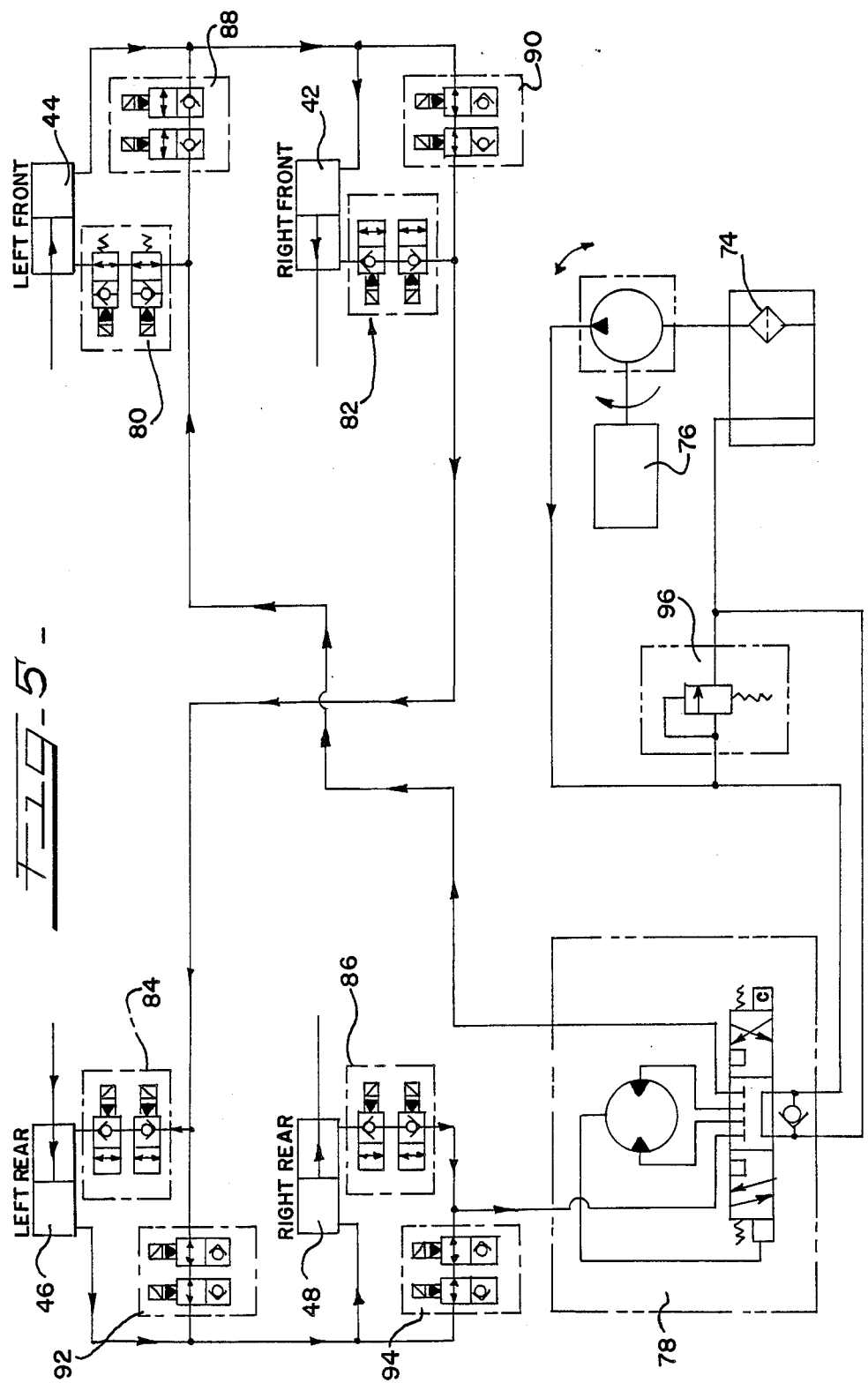

STRADDLE CRANE STEERING SYSTEM

DESCRIPTION

1. Technical Field

This invention relates generally to hydraulic steering systems for straddle-type cranes. It is especially suitable in cranes used for short-distance, overland transport of watercraft.

2. Background of the Invention

Straddle-type cranes are used in a variety of applications requiring transport of large, bulky, or heavy items. For example, such cranes are useful in freight loading or containerized shipping. In such cranes, hydraulic steering systems are used. Examples of such hydraulic steering systems are shown and described in U.S. Pat. No. 4,531,604, issued to Gerald P. Lamer on July 30, 1985, and entitled "Hydraulic Steering Synchronization System;" and U.S. Pat. No. 4,444,287, issued to Richard F. Voelz on April 24, 1984, and entitled "Steering System for Mobile Crane."

In some cranes of this kind, some of the wheels may be steerable and others are not. Other cranes provide steering of all of the wheels and at all four corners of the apparatus. In either case, it is important to ensure that each of the wheels that are turned by the hydraulic steering system are at a predetermined angle.

Misalignment can and frequently does occur. Most commonly, the misalignment occurs when one or more tires hits an irregularity along the road surface, such as a pothole, or when a leak occurs somewhere in the hydraulic circuit. In the event that the steering wheels are not in synchronized alignment, tire scuffing and scrubbing can arise. Such scuffing and scrubbing can cause both excessive tire wear and a potentially hazardous lateral force in the crane's frame structure.

Various means and devices have been used to overcome any of these alignment problems. These means and devices include those disclosed in the above-referenced United States patents. Another means comprises the manual bleeding of the hydraulic cylinders used for turning the wheels. In manual bleeding, the operator operates ball-type cross-circuit valves to bleed hydraulic fluid from one hydraulic cylinder to the other. Such manual resynchronization is cumbersome and time consuming.

Moreover, an operator using any of these alignment systems or regimens frequently did not notice the degree of misalignment until it was truly excessive, which could have resulted in significant damage to the crane's tires.

SUMMARY OF THE INVENTION

The invention is suitable for use in a straddle-type crane having a frame and four corners, and comprises a system for the manual or automatic synchronization of a plurality of pairs of steerable wheels. The pairs of steerable wheels are pivotal relative to the frame. The system comprises a hydraulically-actuated link and tie rod at each corner of the frame to turn all pairs of steerable wheels at each corner of the frame. It further comprises a hydraulic cylinder for each of the hydraulically-actuated links and tie rods, with the hydraulic cylinders being connected to each other in series relationship. The system includes a steering orbitrol which directs hydraulic fluid through the series-connected hydraulic cylinders.

In an alternate embodiment, the system includes a normally open solenoid valve adjacent to and permitting the flow of hydraulic fluid into each of the hydraulic cylinders. A control is provided for selectively closing the solenoid valves adjacent to three of the four cylinders, thereby preventing hydraulic fluid from entering those three cylinders. The orbitrol then directs hydraulic fluid through the remaining open solenoid valve and the fourth of the hydraulic cylinders. In this manner, only the wheels controlled by that fourth hydraulic cylinder are turned.

In yet another embodiment, a feedback system is provided to permit an indication of the amount of wheel rotation at each corner of the crane. The feedback system comprises an encoder for each set of wheels and a counter for each of the encoders. The encoder detects the degree of rotation of the wheel to which it is attached, and sends a specific number of pulses for each degree of wheel rotation to its corresponding counter. The counter both translates the specific number of pulses into the corresponding degree of wheel rotation, and displays that degree of wheel rotation for the operator.

BRIEF DESCRIPTION OF THE DRAWINGS

FIG. 1 is a perspective view of a straddle-type crane in which the present steering system may be advantageously used;

FIG. 2 is a top, overhead view, partially in section and along line 2—2 of FIG. 1, of important components of the steering system in accordance with the invention, showing the left front and rear and the right front and rear systems and their linkages;

FIG. 3 is an enlarged view, partially in section, of the right front steering system and linkage of FIG. 2;

FIG. 4 is a schematic of the hydraulic steering circuit in accordance with the invention, including four series-mounted hydraulic cylinders, a steering orbitrol, and various solenoid valves in a position to allow automatic synchronous turning of the wheels;

FIG. 5 is a schematic of the hydraulic steering circuit in accordance with the invention, with the solenoid valves in a position to allow manual resynchronization of the wheels;

FIG. 6 is a schematic diagram of the feedback system in accordance with the invention, including the encoders secured to adjacent wheel frame assemblies; and pulse counters for providing a visual indication of the angle, in degrees, that a wheel in a given corner of the crane has been turned.

DETAILED DESCRIPTION OF THE PREFERRED EMBODIMENT

Referring now to FIG. 1 of the drawings, the steering system of the present invention is suitable for use in a straddle-type crane 10 of the kind used in moving watercraft over short, overland distances. It should be understood, however, that the steering system of the present invention is also suitable for use in other cranes or hoists, including those used for transporting shipping containers or loading freight. A large boat (not shown) is generally cradled within three slings 12, 13, and 14.

The straddle-type cranes 10 typically have a frame 16 and four corners 18, 20, 22, and 24. In the present embodiment, the crane has four wheels and tires at each corner of the frame, and each of the sixteen wheels are steerable. It will be understood by those skilled in the art that a greater or fewer number of tires may be used at each corner of a crane in this invention.

FIG. 2 is an overhead view, along lines 2—2 of FIG. 1, of important components of the steering system of the invention. It is apparent from this overhead view that each of the components of the four steering systems shown are identical. The systems themselves differ only in that they are arranged in mirror image relationship to each other.

Referring now to both FIGS. 2 and 3, the right front system at corner 20 of crane 10 is shown in FIG. 3 in an enlarged form and with somewhat more detail than, but without the wheels, shown in FIG. 2. As will be more thoroughly explained below, the system provides for either manual resynchronization or automatic synchronous turning of the wheel pairs.

As indicated above, each of the wheels shown in this embodiment are steerable. At the right front corner of the present apparatus, these wheels 26, 28, 30, and 32 are shown in the straight-ahead position. The steering is designed so that each pair of wheels at each corner is pointing at a predetermined angle. Each of the steerable wheels at each corner, including wheels 26, 28, 30, and 32 at right front corner 20, pivot relative to the frame 16.

Referring now to FIG. 3, the right front steering assembly 34 includes an equalizing wheel beam 36. A similar wheel beam is provided for each set of steerable wheels. Pivotally secured to each end of the wheel beam 36 are wheel frame assemblies 38 and 40.

At each corner of the frame 16, a hydraulic cylinder is provided. At corner 20, this hydraulic cylinder is identified as cylinder 42. As will be explained in connection with the description of FIGS. 4 and 5, cylinder 42 and each of the remaining cylinders 44, 46, and 48 at each of the remaining corners are hydraulically connected to each other in a series relationship.

Referring again to FIG. 3, one end 50 of the cylinder 42 is fixed to the beam 36. The other end 52 of the cylinder 42 is located at and pivotally movable about a triple pivot point. A mechanical steering arm 56 is also pivotally connected at one of its ends 58 to this pivot point, and has its other end 60 fixed to the beam 36.

A link 62 has one of its ends 64 secured adjacent both the cylinder 42 and the arm 56 at the triple pivot point, and has its other end 66 fixed to the wheel frame assembly 40. Finally, a tie rod 68 is pivotally attached through tie rod ends 70 and 72 to wheel frame assemblies 40 and 38, respectively.

In the embodiment described in this specification, hydraulic fluid will enter cylinder 42 shown in FIG. 3 from the right and cause the piston 54 to move to the left. The movement of the piston 54 will cause the upper end 64 of link 62 to move upwardly and to the left, while the opposite end 66 of link 62 will move directly to the left. The motion of this end 66 of link 62 will in turn cause wheel frame 40 to move in a clockwise direction, causing its wheels 30 and 32 to move to the right.

The clockwise movement of the wheel frame assembly 40 pulls the tie rod 68 to the left, which in turn moves tie rod end 72 and the lower portion of wheel frame assembly 38 to the left. The entire wheel frame assembly 38, in the same manner as wheel frame assembly 40, thus also moves in a clockwise direction, causing wheels 26 and 28 to move to the right. In order to ensure that all wheels 26 and 28 move to the right at the correct predetermined angle, the length of the tie rod 68 and the position of the tie rod ends 70 and 72 relative to the center line of the beam 36 must be determined for each size of machine. The necessary calculations are well-known to those skilled in the art, are not a part of the present invention, and thus are not elaborated upon in this specification.

Referring now to FIG. 4, a hydraulic schematic diagram of the system in accordance with the present invention is shown. In this schematic, each of the four hydraulic cylinders 42, 44, 46 and 48 are shown in their series-connected relationship. The system includes a conventional orbitrol unit for transporting hydraulic fluid to the hydraulic cylinders upon receipt of the appropriate steering wheel-actuated signal. For example, when the steering wheel is turned to the right, the hydraulic fluid in reservoir 74 is transferred by power unit and pump 76 to the orbitrol 78 and then on to hydraulic cylinders 42, 44, 46, and 48. A pressure relief valve 96 is also provided for protection against the hazards of excessive system pressure.

A pair of solenoid valves is provided for each of the four cylinders. In the normal, automatic mode of operation as depicted in the hydraulic schematic of FIG. 4, solenoid valves 80, 82, 84, and 86 are in the open position. The open position is signified by the dual headed arrows of each valve. The solid lines from the orbitrol 78 to the various solenoid valves and to the hydraulic cylinders represent hydraulic fluid transfer lines. When the dual headed arrows aligned with in the hydraulic fluid transfer lines, as shown for valves 80, 82, 84, and 86 in FIG. 4, then those valves are in their open position.

In contrast, a solenoid valve is in its closed position when the valve's arrow/circle symbol is in the hydraulic line. For example, the arrow/circle symbols of valves 88, 90, 92, and 94 are aligned with the hydraulic fluid transfer lines of FIG. 4, and thus those valves are closed.

The operation of the system may best be understood by reference to FIG. 4. That figure shows the method of system operation when the crane operator turns the steering wheel to the right to effect right hand turning of the apparatus. The arrows in the fluid transfer lines show the route and direction of travel of the hydraulic fluid when the steering wheel is turned to the right.

As may be seen in FIG. 4, the fluid leaves the orbitrol 78 and flows through open solenoid valve 80 into hydraulic cylinder 44 at the left front corner 18 of the crane 10. Because the hydraulic fluid enters cylinder 44 at the base of the piston, the piston and its connecting rod retract.

Because solenoid valve 90 is closed, all of the fluid leaving cylinder 44 forces the fluid adjacent cylinder 42 at the right front corner 20 of the crane 10 to enter that cylinder 42. The hydraulic fluid enters cylinder 42 at the top of the piston, and as a result the piston and its connecting rod are extended. As fluid at the bottom of cylinder 42 is displaced by the extension of the piston, it moves through open solenoid valve 82.

Similarly, fluid enters solenoid valve 84 and the base of cylinder 46 to cause its piston and connecting rod to retract. Hydraulic fluid also enters the top of cylinder 48, causing the extension of its piston and connecting rod. Hydraulic fluid forced by the extended piston through the base of cylinder 48 enters open solenoid valve 86. The series-connected route of the hydraulic lines is completed at the line entering the orbitrol 78 immediately below valves 86 and 94.

The cylinders 42, 44, 46, and 48 are identical. Assuming a closed system, i.e., non-leaking cylinders and hydraulic fluid transfer components and lines, the extent of the movement of the piston within one cylinder will be the same as the extent of the movement of the piston within every other cylinder. Because the degree of wheel travel or pivoting at each corner is mechanically linked to this piston movement, the series-connected pistons will ensure synchronized wheel travel or pivoting at each corner.

However, the present invention also provides a remedy for leakage in hydraulic fluid transfer components or lines, or in hydraulic cylinders. In the event of such leakage, or in the event of misalignment caused by a wheel hitting a pothole or other road hazard, one or more of the sets of wheels at the corners of the crane would be at an angle other than that desired. In that instance, means would be required for determining the extent of the variance from the desired angle, and for moving the set or sets of wheels to that desired angle.

In this invention, these means comprise a control for selectively opening and closing the solenoid valves, as desired by the operator. By opening or closing certain of the solenoid valves, only the incorrectly oriented wheel set or sets are rotated.

A feedback system provides an indication of the amount of wheel pivoting or rotation at each corner of the crane. The feedback system comprises an encoder attached to each set of wheels. A counter for and communicative with each encoder is also provided. The encoder detects the degree of wheel rotation, and sends a specific number of pulses for each degree of wheel rotation to the counter. The counter both translates the specific number of pulses into a signal corresponding to the angle of wheel rotation and provides the operator visual indication of the amount of wheel rotation.

This control and feedback system may be best understood by reference to FIGS. 5 and 6. In FIG. 5, the solenoid valves of the hydraulic steering circuit are shown in the positions necessary to effect a change in the position of one of the four sets of wheels, and particularly to compensate for an inaccuracy in the degree of rotation of the wheel set at the left front corner of the apparatus. The wheel sets at each of the other three corners are all at the appropriate angles relative to each other.

Particularly, when the crane operator notices that the left front wheels are at an incorrect angle, he actuates a control specifically for the wheels at the left front corner and accessible to him from within the cab. Similar controls are provided for each of the other three corners of the crane.

Upon actuation of this control for the left front corner, each of the normally open solenoid valves at the other three corners (82, 84, 86) are closed, and each of the normally closed solenoid valves at the other three corners (90, 92, 94) are opened as shown in FIG. 5. In this figure, the positions of the solenoid valves 80 and 88 at the left front corner 18 of the crane 10 are exactly as they appeared in FIG. 4. However, the positions of each of the solenoid valves at the other three corners of the crane 10 have been changed from closed to open, or open to closed.

Assume that the crane operator noted that the left front corner 18 wheels were offset to the left from the desired angle. Again, after actuating the control for the left front corner, the valves will be in the positions shown in FIG. 5. The arrows of FIG. 5 along the hydraulic fluid transfer lines show the path of the hydraulic fluid through the system when the operator then moves the steering wheel to the right.

As may be seen from those arrows, fluid passes through the cylinder 44 at the left front corner, causing the wheel set at that corner to turn to the right. However, the valves (82, 84, 86) at the inlet or outlet of cylinders 42, 46, and 48 are closed while the valves 90, 92, and 94 are open. Hence, fluid does not enter or exit cylinders 42, 46, and 48. Accordingly, as fluid enters cylinder 44 and causes movement of the left front wheel set, the wheel sets at the remaining corners remain stationary. When the left front wheel set is aligned with the remaining wheel sets, its control is deactivated and the valves at the remaining three corners of the crane return to the positions shown in FIG. 4 for normal, automatic operation of the steering system of the invention.

Details of the feedback system, which provides an indication of the amount of wheel angle or offset, are shown in the schematic diagram of FIG. 6. One such system is provided for each corner of the crane; the feedback system shown in FIG. 6 is for the right front corner 20 of the crane and directly above wheel frame 38.

An incremental shaft encoder 98 powered by a remote power source 104 is securely mounted to beam 36 and directly above the axle 100 of the wheel set. An encoder suitable for the present embodiment is Model 725 ACCV-LODER, manufactured by Encoder Products Company. A connecting shaft 102 is secured at its opposite ends to the encoder and axle 100. As the wheel set and its axle 100 are turned, the connecting shaft 102 is rotated. Depending upon the extent of the rotation, and thus the angle of the axle, a designated number of pulses are sent from the encoder 98 to a counter 106 in the operator's compartment or cab. The counter translates the number of pulses into the degree of wheel angle, and provides the operator with a digital readout of that wheel angle. By comparing the readouts of each of the four counters, the operator can ascertain the angles of each of the wheel sets.

While the specific embodiment has been illustrated and described, numerous modifications come to mind without markedly departing from the spirit of the invention. The scope of protection is thus only intended to be limited by the scope of the accompanying claims.

What I claim is:

1. In a straddle-type crane having a frame and four corners, a system for the manual resynchronization or automatic synchronous movement of a plurality of pairs of steerable wheels, said pairs of steerable wheels being pivotal relative to said frame, said system comprising:
   (a) a hydraulically-actuated link and tie rod at each corner of said frame to turn all pairs of steerable wheels at each corner of said frame;
   (b) a hydraulic cylinder for each of said hydraulically actuated links and tie rods, said hydraulic cylinders being connected to each other in series relationship;
   (c) a steering orbitrol which directs hydraulic fluid through said series-connected hydraulic cylinders;
   (d) a normally open solenoid valve adjacent to and permitting the flow of hydraulic fluid into each of said hydraulic cylinders;
   and (e) a control for selectively closing the solenoid valves adjacent to three of four of said hydraulic cylinders, thereby preventing the flow of hydraulic fluid into said three of four hydraulic cylinders, whereby said orbitrol directs hydraulic fluid through said remaining open solenoid valve and the fourth of said hydraulic cylinders, to thereby effect turning of only the wheels controlled by said fourth hydraulic cylinder.

2. In a straddle-type crane having a frame and four corners, a system for the manual resynchronization or automatic synchronous movement of a plurality of pairs of steerable wheels, said pairs of steerable wheels being pivotal relative to said frame, said system comprising:
   (a) a hydraulically-actuated link and tie rod at each corner of said frame to turn all pairs of steerable wheels at each corner of said frame;
   (b) a hydraulic cylinder for each of said hydraulically actuated links and tie rods, said hydraulic cylinders being connected to each other in series relationship;
   (c) a steering orbitrol which directs hydraulic fluid through said series-connected hydraulic cylinders;
   (d) a feedback system to provide an indication of the amount of wheel rotation at each corner of said crain, said feedback system comprising an encoder for each set of wheels; and
   (e) a counter for each of said encoders, said encoder detecting the degree of rotation of the wheel to which it is attached, and sending a specific number of pulses for each degree of wheel rotation to said counter, said counter both translating said specific number of pulses into a corresponding degree of wheel rotation and displaying said degree of wheel rotation.

3. In a straddle-type crane having a frame and four corners, a system for the manual or automatic synchronization of a plurality of pairs of steerable wheels, said pairs of steerable wheels being pivotal relative to said frame, said system comprising:
   (a) a hydraulically-actuated link and tie rod at each corner of said frame to turn all pairs of steerable wheels at each corner of said frame;
   (b) a hydraulic cylinder for each of said hydraulically-actuated links and tie rods, said hydraulic cylinders being connected to each other in series relationship; and
   (c) a steering orbitrol which directs hydraulic fluid through said series-connected hydraulic cylinders;
   (d) a normally open solenoid valve adjacent to and permitting the flow of hydraulic fluid into each of said hydraulic cylinders;
   (e) a control for selectively closing the solenoid valves adjacent to three of four of said hydraulic cylinders, thereby preventing the flow of hydraulic fluid into said three of four hydraulic cylinders, whereby said orbitrol directs hydraulic fluid through said remaining open solenoid valve and the fourth of said hydraulic cylinders, to thereby effect turning of only the wheels controlled by said fourth hydraulic cylinder; and
   (f) a feedback system to provide an indication of the amount of wheel rotation at each corner of said crane, said feedback system comprising an encoder for each set of wheels and a counter for each of said encoders, said encoder detecting the degree of rotation of the wheel to which it is attached, and sending a specific number of pulses for each degree of wheel rotation to said counter, said counter both translating said specific number of pulses into a corresponding degree of wheel rotation and displaying said degree of wheel rotation.

4. The system as set forth in claim 3, further comprising a connecting shaft secured at its opposite ends to said encoder and to an axle between a pair of wheels, the rotation of said connecting shaft being equal to the degree of rotation of said wheels.

* * * * *